Feb. 20, 1951          I. CISSKI          2,542,939
VIEW FINDER MASKING DEVICE
Filed Jan. 12, 1946          3 Sheets—Sheet 1
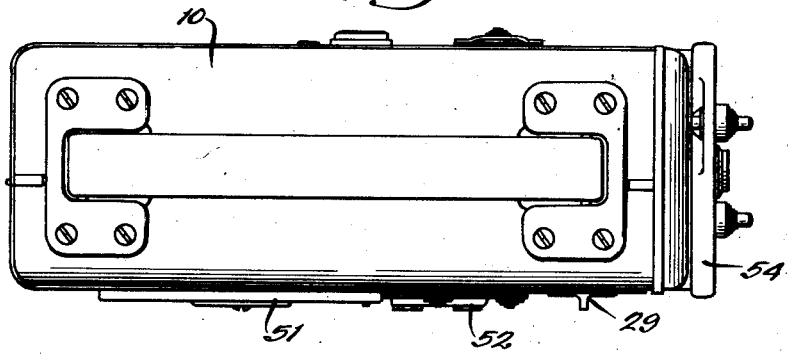
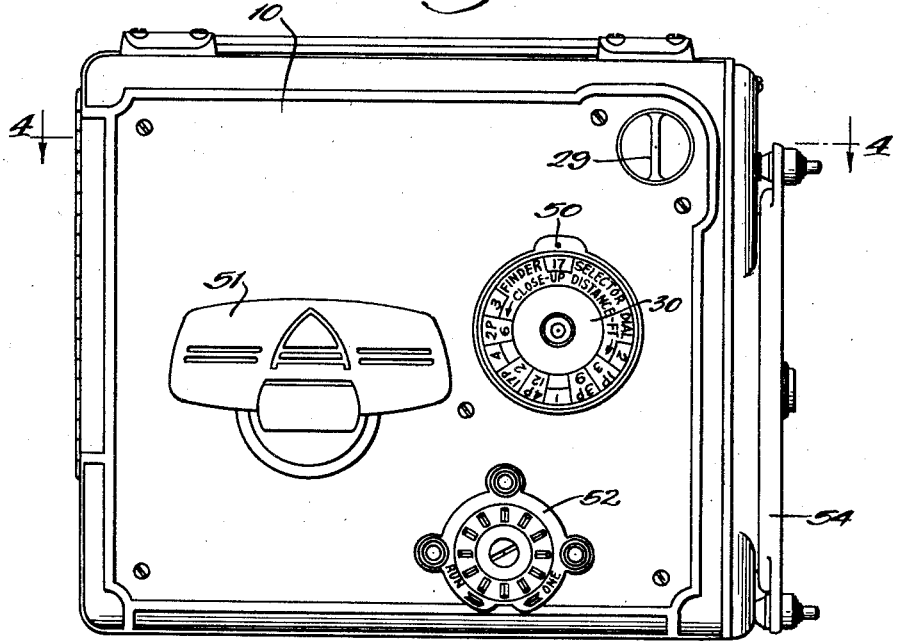
INVENTOR
Irving Cisski,
BY
Soans, Pond & Henderson
ATTORNEYS.

Feb. 20, 1951     I. CISSKI     2,542,939
VIEW FINDER MASKING DEVICE
Filed Jan. 12, 1946     3 Sheets—Sheet 2
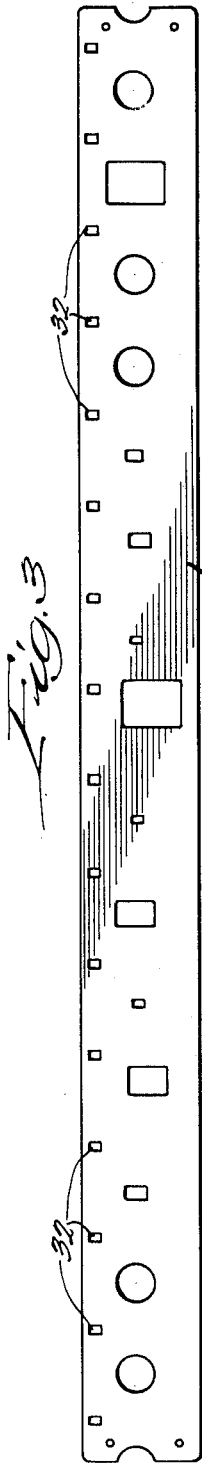
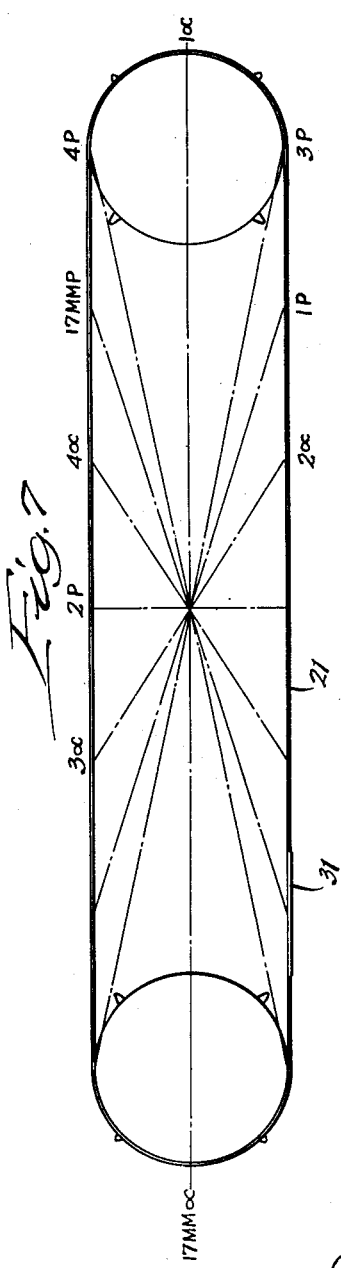
INVENTOR
*Irving Cisski*,
BY *Soans, Pond & Anderson*
ATTORNEYS.

Feb. 20, 1951
I. CISSKI
2,542,939
VIEW FINDER MASKING DEVICE
Filed Jan. 12, 1946
3 Sheets-Sheet 3
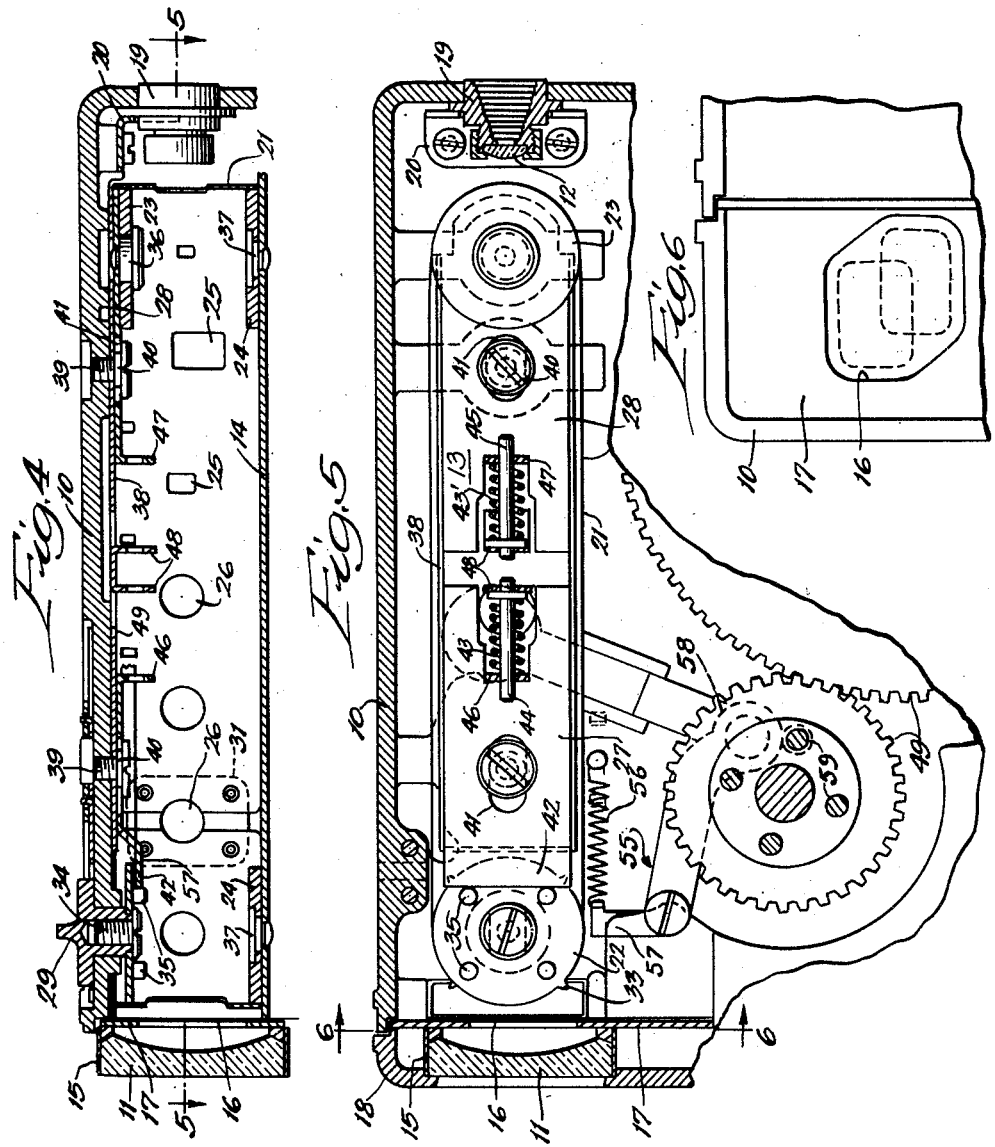
INVENTOR
Irving Cisski,
BY
Soans, Pond & Anderson
ATTORNEYS Patented Feb. 20, 1951

2,542,939

UNITED STATES PATENT OFFICE 2,542,939

VIEW FINDER MASKING DEVICE

Irving Cisski, Schiller Park, Ill., assignor, by mesne assignments, to General Precision Laboratory Incorporated, a corporation of New York Application January 12, 1946, Serial No. 640,954

3 Claims. (Cl. 33—64)

This invention relates to masking devices for view finders, comprising universal focus viewing optical systems of axially spaced objective and eyepiece lenses, used with optical systems of changeable focal length, as for example optical systems having axially movable or interchangeable lens elements, which optical systems are capable of forming, at each focal length, an image of a field of definite size located at a definite distance and also an image of a more distant field of a different size located at an indefinite distance. Such masking device enables an operator, looking into the universal focus viewer system to see the size and location of the field, the image of which the main optical system is capable of forming at a given focal length. The present masking device provides for indicating the size and location of both the close and distant fields at each focal length, and additionally, means is provided in conjunction with the masking device for not only identifying the character of the field as close or distant, but also for indicating the focal length of the system that will produce an image of a field of the indicated size and location.

The invention is herein disclosed as embodied in a motion picture camera of small size and designed for amateur use, but it will be evident that the masking device is useful in connection with any optical device comprising an image-forming lens system of changeable focal length with which it is desirable to make provision for indicating to the operator the size and location of a field an image of which is to be or is being produced by the optical device.

The primary object of the invention is to provide a novel form of masking device for a view finder, capable of use with an optical device comprising a lens system of changeable focal length, and providing means for indicating to an operator of such device the sizes and locations of both close and distant fields of which the lens system is capable of forming images at various focal lengths.

Another object is the provision of such a device capable of including a large number of masks for a view finder system, so that it may be used with an optical device having a substantial number of selectively used focal lengths, without requiring a bulky or complicated masking assembly, and without requiring employment of interchangeable masking parts in the assembly, and providing for quick and easy shifting from one mask to another.

Still another object is the provision of an indicating device for such a masking assembly, which automatically will indicate the focal length of the image-producing system that will produce an image of the designated size, and that further will show whether such field is the close or distant one of the system at the indicated focal length.

As an example of a practical field of utility, the invention is herein disclosed as used in a small motion picture camera.

In the taking of motion pictures with the smaller size cameras, such as the 16 mm., with interchangeable taking lenses, superior pictures are likely to result if the operator is enabled to mask the view finder so that his vision through the view finder approximates as nearly as possible the vision through the selected taking lens. For such masking of the view finder to be most effective it is desirable to have two masks for each size of taking lens used with the camera; one mask for close-up views and the other mask for distant views.

The masks for use in taking close-ups, in addition to modifying the area of the objective lens visible through the view finder, must also be so formed and alined with the view finder as to compensate for the parallax between the line of vision from the operator's eye to the scene and the line of vision from the taking lens to the scene. These masks, therefore, are referred to generally as "parallax" masks. The masks for use in taking distant scenes merely require modifications in the area of the objective lens visible through the view finder. These masks are referred to generally as "infinity" masks.

Heretofore various means have been employed to provide the operator with view-finder masks which have made provision for parallax adjustment. For the most part, the use of these devices has necessitated making a number of manual adjustments in readying them for usage. From the standpoint of convenience and simplicity, the necessity for making so many manipulations has proven quite unsatisfactory. Furthermore, such devices are usually a separate unit in the nature of an accessory requiring attachment to the exterior of the camera.

The main advantages of this invention, therefore, as applied to such a motion picture camera, are that it provides an improved form and arrangement of view-finder masks built into the camera housing; providing improved means for actuating said device so that any one of several masks may be quickly and conveniently placed in proper registering position in the view finder; and providing improved indicating selector means ocordinated with said actuating means for indicating which mask is in registering position in the view finder.

The preferred embodiment of this invention is shown in the accompanying drawings, on a scale somewhat larger than actual size, in which Fig. 1 is a side elevation of a motion picture camera wherewith this improved view-finder masking-device is incorporated;

Fig. 2 is a top view of the same;

Fig. 3 is a full-length view of the apertured band used for masking the view finder;

Fig. 4 is a further enlarged fragmentary cross-sectional view taken on the line 4—4 of Fig. 1 showing the mask band in place in the camera housing;

Fig. 5 is a vertical elevation of the same taken on the line 5—5 of Fig. 4;

Fig. 6 is a view taken on the line 6—6 of Fig. 5 showing in full lines the shape of the opening in the camera housing adjacent the objective lens, and showing in full and dotted outlines the relative positions of the "infinity" and "parallax" masks, respectively, for the shortest focal-length taking lens when such masks are in position for masking the view finder; and Fig. 7 is a diagrammatic view indicating the relative positions of the pairs of masking openings formed in the continuous band about the clearance openings.

A motion picture camera, equipped with this improved view-finder masking-device, comprises a housing 10 in the top portion of which are mounted the view-finder lenses 11 and 12, between which is arranged this improved masking device 13. Associated with the housing 10 is a partition 14 which divides the interior of the housing into compartments to accommodate the film magazine and operating mechanism for the camera, respectively.

The view finder comprises an objective lens 11 and an eye lens 12 of the usual construction and mounted in any usual manner as on the housing 10 of such a camera as herein disclosed. The objective lens 11 is secured in a mounting 15, directly in front of an aperture 16, formed in a shutter mechanism plate 17, which is secured to the forward end of the main camera housing 10 by an end cap 18. The eye lens 12 is supported in a mount 19 held in place by a bracket 20 secured to the inner wall of the main housing 10.

In order to enhance the benefits derivable from the improved view-finder masking device 13, to be described directly, the optical axis of the objective lens is offset slightly inwardly and downwardly from the optical axis of the eye lens 12 in the direction of the axis of the optical system of the device with which the view finder is used, here being the axis of the taking lens of the camera. Because of the differences in the axial relationship of the "infinity" and "parallax" masks, of the largest pair of masks, with axes of the view-finder lenses, it is necessary to have the aperture 16 in the partition 17 of an ununiform polygonal shape, as shown in Fig. 6.

The masking device 13 comprises an apertured band 21 mounted on a pair of rollers 22 and 23 and a pair of idlers 24, so that the masking apertures 25 and the clearance apertures 26 may be brought into proper registering alinement with each other and with the axis of vision through the objective lens 11 and the eye lens 12. The proper registration and alinement of these apertures is ensured by a spring-actuated slide 27 bearing against pins 35 on the roller 22. The band is properly tensioned by means of the spring-actuated slide member 28. The shifting of the band is effected by an operating knob 29 which is connected to an indicator 30 (Fig. 1) on the outside of the camera housing 10.

The mask band 21 is shown in its full length in Fig. 3. As clearly indicated this band is provided with two sets of masking apertures 25 for each of five different focal lengths of lenses, namely, 17 mm., 1", 2", 3", and 4". The six circular clearance apertures 26 are formed in the band to provide the necessary clearance openings registering with the eye lens 12 when certain masking apertures 25 are in registration with the objective lens 11, so that vision may be unobstructed between the two lenses. The relative placing of these two types of apertures 25 and 26, in the band 21, is important. It is necessary to have an aperture located in registration with each of the lenses 11 and 12 in order to permit clear vision through the view finder. In certain instances a masking aperture 25, in registration with the eye lens 12, may be of a size to permit it to serve as a clearance opening for a masking aperture 25 that is in functioning position at the objective lens. Where two masking apertures do not come into registration with the line of vision through the lenses 11 and 12, so that one such masking aperture may serve as a clearance opening for the masking aperture that is in functioning position, a special clearance aperture 26 has to be provided. Six such apertures 26 are required, as shown in Fig. 7. This figure also illustrates how all of these apertures complement each other to serve as masking and clearance apertures.

The mask strip 21 is placed around the rollers 22 and 23 and the idlers 24, and the ends are secured together by means of a splice member 31 (see Fig. 4). Perforations 32 are formed along one edge of the strip 21 to register with sprocket teeth 33 on the roller 22, whereby the proper shifting of the band is effected through the turning of the operating knob 29.

The sprocket roller 22, having the sprocket teeth 33, is rotatively fixed to the operating knob 29 by the screw 34 (see Fig. 4). A series of pins 35 are arranged on the face of the roller 22 so that any pair thereof may engage the spring-actuated slide 27 and locate the mask apertures 25, one at a time, in proper registration with the opening 16 and the line of vision through the lenses 11 and 12.

The roller 23 is journaled on the sliding plate 28 by means of a stud 36. The idlers 24 are journaled on the partition 14 by means of studs 37. These idlers 24 merely serve to support and round out the band 21 along its edges opposite the rollers 22 and 23.

The members 27 and 28 are slidably supported in a channel member 38 by means of shouldered screws 39 secured to the housing 10. The shoulders 40 on the screws 39 serve the dual function of clamping the channel member firmly to the housing 10 and slidably supporting the members 27 and 28 in position on the channel member 38, by reason of the slots 41 formed in the respective members 27 and 28 and embracing the shoulders 40.

As most clearly shown in Fig. 4, the outer end of the plate 27 is offset at 42 so that it is in position to abut against the pins 35 on the sprocket roller 22.

Compression springs 43 and 43' normally urge the members 27 and 28 in opposite directions to ensure contact of the offset 42 with the pins 35 on the sprocket roller 22 and to keep a suitable tension on the mask band 21. These springs embrace the rods 44 and 45, respectively, and exert their pressure between the ears 46 and 47, offset respectively from the sliding plates 27 and 28, and the ears 48, offset from the channel member 38. The spring 43 urges the plate 27 to the left of Fig. 5 against the pins 35, whereas the spring 43' urges the plate 27 to the right of Fig. 5 to keep the proper tension on the mask band 21.

The operating knob 29 is connected by a train of gears 49, with the indicator 30. The end ratio of the gears between knob 29 and dial 30 is four to one so that it requires four complete rotations of the knob 29 to make one complete rotation of the indicator dial 30. The pitch of the mask apertures 25 and 26 is such that one of these apertures is put in registration with the objective lens 11 for each one-quarter turn of the knob 29. The view-finder masking device is in a functioning condition only when an aperture 25 is in registration with the objective lens 11. When a clearance aperture 26 is in registration with the objective lens 11 the masking device is not functioning.

The indicator dial 30 has two concentric series of indicia. The outer series indicates which of the mask apertures 25 is in registration with the objective lens 11. The inner series of indicia indicates the distance in feet at which the view to be taken is to be located from the taking lens when a "parallax" mask is used. In the outer series indicia the number refers to the focal length of the lens which is being used with the camera, whereas the letter indicates that a "parallax" mask is in registration with the objective lens 11. Where a blank occurs in the inner series of indicia opposite a number (without letter "P") in the outer series of indicia it indicates that an "infinity" mask is in registration with the lens 11.

Associated with the index dial 30 is a marker 50 (see Fig. 1) with which the various indicia on the dial 30 are to be brought into registration when a certain character of mask is to be registered with the view-finder lenses. Thus, when, through the turning of the knob 29, the dial 30 is rotated so that "17" is in registration with the marker 50, it indicates that the "17 mm. infinity" mask is in functioning position. Accordingly, the view which the operator sees through the view finder will correspond with the "distant" or "infinity" view which is to be recorded on the film. Correspondingly, when the numerals "1," "2," "3," or "4" are brought into registration with the marker 50, the respective masks for "distant" or "infinity" views are in registration with the view-finder lenses 11 and 12 for 1", 2", 3", or 4" focal-length taking lenses.

Similarly, when the indicia "17P 2" is in registration with the marker 50, it means that the "parallax" mask, for taking a picture with a "17 mm." focal-length lens, is in registration with the view-finder lenses and that the object to be taken should be two feet from the lens. In like manner when the indicia "4P 12" is in registration with the marker 50 is means that the "parallax" mask for a 4" focal-length lens is in position for an object to be taken 12 feet from the taking lens. From Fig. 1 it will be noted that, with the exception of the number "17," all of the indicia are evenly spaced adjacently around the dial 30. Between the number "17" and the numerals "2" and "3," on the outer series of indicia, are spaces equal to twice and four times, respectively, the spacing of the indicia on the remainder of the dial. These spaces represent the non-functioning positions of the masking device, namely, when one of the clearance apertures 26 is in registration with the objective lens 11.

The part 51, shown in Fig. 1, is the key whereby the camera motor is wound. The part 52 shown in the same view is the manual control by which the operating mechanism is released for a "one" picture, or a continuous "run" of pictures.

More specifically the drive from operating knob 29 to dial 30 comprises a bell crank 55 biased to a central, non-operating position by a spring 56. The bell crank 55 has an actuated arm 57 positioned for contact and movement by sprocket teeth 33 as wheel 42 is rotated in either direction, to swing two-way ratchet arm 58 in a corresponding direction and thereby drive the input gear 49 and dial 30 in corresponding directions, through driving contact between two of four ratchet-driven elements 59 carried by input gear 49. The output gear 49 is secured direct to dial 30.

The operation of a view-finder mask of this kind is as follows:

In preparing to take a series of pictures, the camera lens of desired focal length is placed in position in the lens mounting of the camera. Such a lens may be on a turret mechanism 54, mounted on the camera, or it may be individually placed in a conventional single lens mount. Assuming that such a lens is a 3" focal-length lens, the operator then determines whether the view to be taken is a close-up or a "distant" or "infinity" view. If the view is to be a close-up, the operator turns the knob 29 in either direction so as to bring the indicia "3P9" into registration with the marker 50. This will bring into registration with the objective lens 11 the "parallax"-mask aperture 25 for a 3" focal-length lens. The operator would then estimate or measure a nine-foot distance from the view to be taken. Sighting through the view finder the operator would see framed in the mask opening 25 the scene which will be reproduced upon the film, when the operator shifts the control button 52 to release the motor-mechanism control.

If, on the other hand, the operator desires to take a long-distance scene with the 3" focal-length lens, he would turn the knob 29 to bring the number "3" on the outer series of indicia into registration with the marker 50. This would shift the proper "infinity" mask aperture 25 into alinement with the view-finder lenses 11 and 12. Thereupon, sighting through the view finder, the operator would see framed in the mask aperture 25 substantially the scene which would be reproduced upon the film upon shifting the control button 52.

Each time the knob 29 is turned one of the pins 35, on the sprocket roller 22, shifts the plate 27 against the action of the spring 43. As soon as the pin passes the horizontal plane, through the axis of the roller, the spring 43 tends to press the member 27 against the pin 35 until two of the pins come into registration with the forward edge of the offset 42. Upon the absence of any further turning of the knob 29 an aperture 25 or 26 will be in alinement with the view-finder lenses, as indicated by the registration of the corresponding indicia, with the marker 50.

During any shifting of the sprocket roller 22, the spring 43' keeps a sufficient tension on the band 21, so that at all times it is held taut.

Variations and modifications in the details of structure and arrangement of the parts may be resorted to within the spirit and coverage of the appended claims.

We claim:

1. A view finder assembly comprising an optical system of axially spaced objective and eyepiece lenses, casing walls extending between said lenses substantially parallel to the optical axis and forming an elongated light passage for the system, a flexible mask band having elongated side reaches spaced on opposite sides and extending along substantially parallel to the axis of the system, said band transversely crossing the optical system adjacent each lens and having plural mask-forming openings spaced along it and arranged in pairs that simultaneously register with said lenses, and means for moving said band lengthwise.

2. In a view finder assembly comprising an optical system of axially spaced objective and eyepiece lenses and a casing wall extending alongside said system, and a flexible mask band having side reaches extending along and on opposite sides of the optical system; band-tensioning mounting means supporting a roller about which said band is trained comprising a plate supported on said casing wall between said lenses and slidable axially of the optical system, spring means urging said plate in the direction of one of the lenses, and a stud shaft supported on the plate and rotatably mounting said roller.

3. In a view finder assembly comprising an optical system of axially spaced objective and eyepiece lenses and a casing wall extending alongside said system, and a flexible mask band having side reaches extending along and on opposite sides of the optical system and one of its edges being provided with sprocket tooth holes along its edge and mask-forming openings in definite axial relation to said holes; means for driving said band and registering the masking openings with the lenses comprising a roller mounted on the casing wall adjacent one lens and about which is trained the edge of the band provided with holes, a series of studs projecting from a side face of said roller, a plate mounted on said casing wall for sliding relative to said roller and having a detent surface contacting said studs for indexing the roller and band, spring means urging said plate in the direction of the roller and means for turning said roller.

IRVING CISSKI.

REFERENCES CITED

The following references are of record in the file of this patent:

UNITED STATES PATENTS

| Number | Name | Date |
|---|---|---|
| 1,795,490 | Howell | Mar. 10, 1931 |
| 2,157,547 | Leitz | May 9, 1939 |
| 2,187,246 | Nerwin | Jan. 16, 1940 |

FOREIGN PATENTS

| Number | Country | Date |
|---|---|---|
| 51,301 | Switzerland | Jan. 15, 1910 |